I. C. TERRY & G. H. SAUER.
Car-Axle Box.

No. 218,084.      Patented July 29, 1879.

Witnesses:
C. W. H. Brown
Walter Allen

Inventors:
Ira C. Terry
Geo. H. Sauer
By Knight Bros.
Attys.

UNITED STATES PATENT OFFICE.

IRA C. TERRY AND GEORGE H. SAUER, OF ST. LOUIS, MISSOURI.

IMPROVEMENT IN CAR-AXLE BOXES.

Specification forming part of Letters Patent No. 218,084, dated July 29, 1879; application filed November 13, 1878.

*To all whom it may concern:*

Be it known that we, IRA C. TERRY and GEORGE H. SAUER, both of the city of St. Louis, in the State of Missouri, have invented a certain new and useful Improvement in Journal-Boxes for Cars, of which the following is a full, clear, and exact description, reference being had to the accompanying drawings, forming part of this specification.

Our improvement may be applied to ordinary railway-cars or to street-railway cars.

In our improvement the vertical bearing of the axle consists of a roller of greater diameter than the axle, and vertically over the axle. The side bearings of the axle are against bearing-pieces dovetailed into metallic troughs upon each side, containing hard grease that flows, when warmed, through orifices in the sides of the troughs and bearing-pieces of wood.

The roller we prefer to make hollow, to contain hard grease, which is in contact with the arbor-pin, on which it turns, and this pin passes through the grease-box, and is fitted with a nut at one or both ends to hold it in place, as shown.

The drawings show our improvement as applied to street-railway-car axles.

Figure 1:
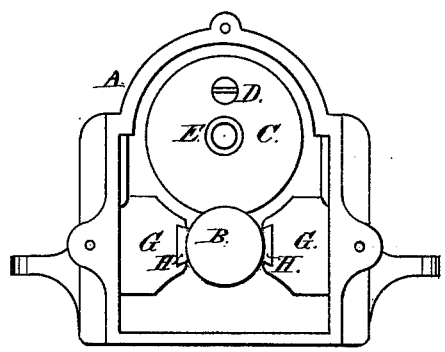
Figure 2:
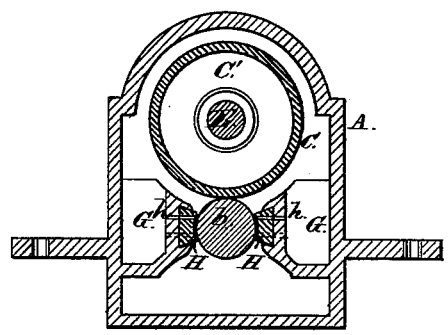
Figure 3:
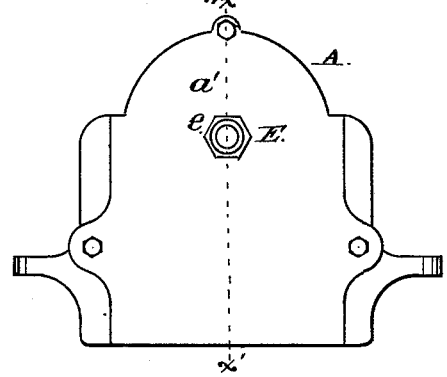
Figure 4:
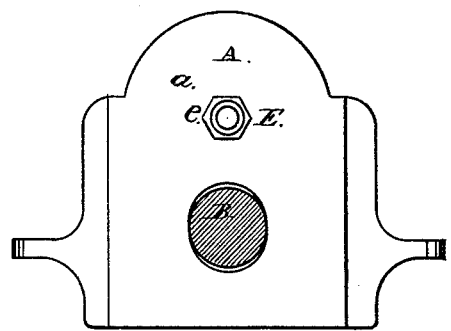
Figure 5:
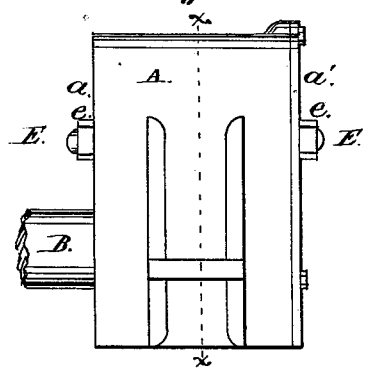
Figure 6:
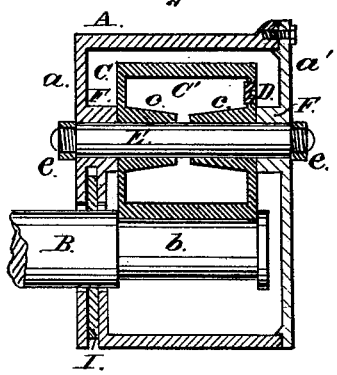

Figure 1 is an end view of the box with the cap removed. Fig. 2 is a section at line $x\ x$, Fig. 5. Fig. 3 is an outside end view. Fig. 4 is an inside end view. Fig. 5 is a side view. Fig. 6 is a section at $x'\ x'$, Fig. 3.

A is the grease-box, which may be of common construction. B is an ordinary axle, extending through the inner end, $a$, of the box A. The journal of the axle is shown at $b$, and upon this rests a roller, C, which is preferably made hollow, to contain some suitable lubricant. The roller C turns on an arbor, E, which passes through both the rear end, $a$, of the box A and the outer end or cap, $a'$, and upon its ends are nuts $e$, bearing against the outside of the box A. The end of the roller C has a hole for the introduction of grease, stopped by a screw-plug, D.

Upon the inner sides of the ends $a$ and $a'$ are cast bosses F, through which the arbor E passes, and which form end bearings for the roller C.

The roller C has long bearings or hubs $c$, between which the grease contained in the hollow grease-chamber C' comes in contact with the arbor, so as to lubricate the bearing by gradually working outward along the arbor.

We prefer to use in the roller a grease that is not liquid at ordinary temperature of the air, trusting to the slight heat generated by friction to liquefy sufficient for lubricating requirements, and thus the quantity supplied is regulated according to the need, the heat increasing with the friction.

Upon the sides of the box A are grease cups or troughs G, whose sides form side bearing for the axle, to hold it in its position beneath the roller C. Each of these cup-bearings G is preferably made with a removable bearing-piece, H, that is shown fitted to the cup with a dovetail-joint, so as to admit of removal and renewal as it becomes worn away. We prefer to make this bearing-piece of brass or steel; but do not confine ourselves to these metals, as any metal would answer the purpose.

Through the side of the cup G and the bearing-piece H are grease-holes $h$, through which the grease runs from the cup to the journal of the axle.

We prefer to use in the cups G the same description of grease used in the roller C, so that the supply will be equal to the requirements, as before described; but we make no claim to the use of hard grease for this purpose, because it is not original with us.

I is a packing-plate, fitting the axle and occupying a recess in the inner wall, $a$, of the box, to exclude the dust from the interior of the box. We do not claim to be the inventors of the plate I in this connection.

We claim as our invention—

1. The combination of axle B, a bearing-roller, C, vertically above it, and side bearings, G, with recesses to contain grease, and oil-holes $h$, substantially as and for the purpose set forth.

2. The combination, with axle B, of the bearing-roller C, resting directly on top of said axle, and having in its interior the close-ended hollow chamber C', for the reception of the lubricating material, hubs or bearings c, and the arbor E, passing through said chamber in contact with the lubricating material, substantially as set forth.

3. The combination, with the axle B, of the side bearings, G, having cavities, to contain grease, and holes h, for the outflow of grease to the axle-journal.

IRA C. TERRY.
GEO. H. SAUER.

Witnesses:
GEO. H. KNIGHT,
C. W. H. BROWN.